United States Patent [19]
Brotto et al.

[11] Patent Number: 5,757,163
[45] Date of Patent: May 26, 1998

[54] BATTERY CHARGER AND METHOD FOR SIMULTANEOUSLY CHARGING MULTIPLE BATTERIES FROM A SINGLE POWER SUPPLY

[75] Inventors: Daniele C. Brotto; William F. Hilsher, both of Baltimore. Md.

[73] Assignee: Black & Decker Inc., Newark, Del.

[21] Appl. No.: 536,746

[22] Filed: Sep. 29, 1995

[51] Int. Cl.$^6$ .................................................. H01M 10/46
[52] U.S. Cl. ............................................................. 320/155
[58] Field of Search .................... 320/6, 15, 20, 320/21, 22, 30, 31, 32, 39, 40, 116, 120, 132, 155, 156, 157, 105, 114, 119, 130, 131, 138

[56] References Cited

FOREIGN PATENT DOCUMENTS

| | | |
|---|---|---|
| 0 121 325 | 10/1984 | European Pat. Off. |
| 0 361 859 | 4/1990 | European Pat. Off. |
| 0 222 381 B1 | 7/1992 | European Pat. Off. |
| 0 314 155 B1 | 3/1995 | European Pat. Off. |
| 2 139 434 | 3/1987 | United Kingdom. |
| 2 219 151 | 4/1989 | United Kingdom. |
| 2 226 715 | 7/1990 | United Kingdom. |
| 2 242 794 | 10/1991 | United Kingdom. |
| 2 259 615 | 3/1993 | United Kingdom. |
| WO 90/15466 | 12/1990 | WIPO. |

*Primary Examiner*—Edward Tso
*Attorney, Agent, or Firm*—Harness, Dickey & Pierce, P.L.C.

[57] ABSTRACT

A battery charger for simultaneously charging a plurality of batteries from a single power source includes a microcontroller-based circuit that is programmed to multiplex full charging current sequentially to each battery in the charger. Charge termination in the preferred embodiment is determined by monitoring total charge time and by detecting a predetermined drop in battery voltage—i.e., "minus $\Delta V$". The microcontroller is programmed to individually track the actual charge time of each battery in the charger and to adjust the clock rate of each battery accordingly when multiple batteries are charged at the same time. In addition, the minus $\Delta V$ charge termination criteria is temporarily disabled for any battery in the charging process when one or more batteries are inserted into the charger to prevent erroneous detection of a full charge condition.

21 Claims, 6 Drawing Sheets

NICKLE-CADMIUM BATTERY CHARGING CYCLE

Fig-4

| MEMORY BANK FOR BATTERY PORT 1 |
|---|
| BATTERY CLOCK |
| RAW $V_{BATT}$ DATA |
| NEW $V_{BATT}$ DATA |
| MAX $V_{BATT}$ DATA |
| OLD $V_{BATT}$ DATA |
| CHARGER OPERATION ENTRY POINT ADDRESS |
| CHARGER CONTROL FLAGS |

| MEMORY BANK FOR BATTERY PORT 2 |
|---|
| BATTERY CLOCK |
| RAW $V_{BATT}$ DATA |
| NEW $V_{BATT}$ DATA |
| MAX $V_{BATT}$ DATA |
| OLD $V_{BATT}$ DATA |
| CHARGER OPERATION ENTRY POINT ADDRESS |
| CHARGER CONTROL FLAGS |

| MEMORY BANK FOR BATTERY PORT 3 |
|---|
| BATTERY CLOCK |
| RAW $V_{BATT}$ DATA |
| NEW $V_{BATT}$ DATA |
| MAX $V_{BATT}$ DATA |
| OLD $V_{BATT}$ DATA |
| CHARGER OPERATION ENTRY POINT ADDRESS |
| CHARGER CONTROL FLAGS |

| MEMORY BANK FOR BATTERY PORT 4 |
|---|
| BATTERY CLOCK |
| RAW $V_{BATT}$ DATA |
| NEW $V_{BATT}$ DATA |
| MAX $V_{BATT}$ DATA |
| OLD $V_{BATT}$ DATA |
| CHARGER OPERATION ENTRY POINT ADDRESS |
| CHARGER CONTROL FLAGS |

BATTERY CHARGER AND METHOD FOR SIMULTANEOUSLY CHARGING MULTIPLE BATTERIES FROM A SINGLE POWER SUPPLY

BACKGROUND OF THE INVENTION

The present invention relates generally to a method and apparatus for rapidly and efficiently charging a plurality of batteries from a single power supply.

Due to the rapidly increasing use of rechargeable batteries, the need to rapidly and efficiently charge batteries has increased accordingly. Particularly in the power tool field, the growing popularity of cordless tools has created a need for a battery charger that can simultaneously charge a plurality of battery packs. However, certain difficulties arise when charging multiple batteries from a single power source. Firstly, the charger must be able to accommodate any combination of battery bay occupation. Secondly, the charger must accommodate batteries having different levels of charge. Thirdly, the charger must be capable of handling dynamic situations as users randomly remove or insert battery packs, without disrupting individual charging cycles. Lastly, it is desirable for the battery charger to be able to address these concerns while maintaining its ability to rapidly and efficiently charge the multiple batteries.

For example, it is known that discharged batteries accept charging current more efficiently when current is maintained at relatively high levels. Thus, a discharged battery pack that takes 60 minutes to fully charge at a one-amp charge level, will generally take substantially more than four hours to fully charge at a 250 milliamp charge level. Consequently, if the multiple batteries being simultaneously charged are simply connected in parallel, the charging efficiencies of all the batteries will be greatly reduced. This is due to the fact that each parallel-connected battery will reduce proportionately the amount of charging current supplied to each battery. In other words, if four battery packs are inserted into a one-amp charger, each battery pack will receive only 250 milliamps of charge current. Consequently, whereas the battery charger may be capable of fully charging a single battery pack in 60 minutes, it may require up to 5.2 hours to simultaneously charge four batteries.

Additionally, since rapid charging of a battery requires relatively high current, it is important to terminate the charging procedure before the battery pack is overcharged, as charging beyond full battery charge can cause battery deterioration and ultimately battery failure. Various control techniques for monitoring the state of charge of a battery and detecting a full charge condition are known. For example, U.S. Pat. Nos. 4,388,582 and 4,392,101, both to Saar et al. and assigned to the same assignee as the present invention, disclose a charging system that monitors battery voltage during the charging process and in particular the slope of the resulting voltage versus time curve. Because the voltage versus time charging curve for a particular type of battery will exhibit essentially the same characteristics, it is possible to monitor the charging process and accurately determine the full charge condition.

With reference to FIG. 1 in the drawings, a typical voltage versus time charging curve for a nickel-cadmium (NiCad) battery is shown. Although the specific values of the curve may differ from battery to battery, the general shape of the curve is typical for all NiCad batteries. As is apparent, the voltage of the battery continuously rises during the charging process until a maximum value is attained. As illustrated in the diagram, the charge process can be separated into five distinct regions. Region I represents the beginning of the charging sequence. In this region, the voltage characteristics are somewhat unreliable and may vary from battery to battery in accordance with its prior history of being charged and discharged. It is for this reason that region I is shown as a dotted line. Further, this region is not important in the charging sequence since it is generally traversed within a relatively short period of time after the start of the charging sequence.

Within approximately 30–60 seconds of starting the charging sequence, the charging curve will enter the more stable region II. Region II is generally the longest region of the charging sequence, and is marked by most of the internal chemical conversion within the battery itself. As is apparent, the voltage of the battery does not increase substantially over this region. At the end of region II is an inflection point A in the curve. Inflection point A represents a transition from region II to region III and is noted by a point where the slope of the curve changes from a decreasing rate to an increasing rate.

Region III is the region in which the battery voltage increases quite rapidly. As the battery reaches its fully charged condition, the internal pressure and temperature of the battery also increase substantially. When these effects begin to take over, the increase in battery voltage begins to taper off. This is noted as the inflection point B.

Region IV represents the fully charged region between inflection point B and the peak of the curve represented by point C. The voltage only stabilizes at point C for a short period of time. If charging continues, the additional heating within the battery will cause the voltage of the battery to decrease and, in addition, may damage the battery.

By analyzing the inflection points of the voltage-time curve, it can be determined at what point the battery has reached maximum charge. This is done by first determining inflection point A and then looking for inflection point B. Once inflection point B is observed, the charging process can be discontinued. Since it is possible to determine the inflection points very rapidly and accurately, it is possible to halt the charging process, or maintain the charging process at a maintenance charge, following detection of the second inflection point.

In addition, the above-noted Saar et al. patents also describe alternative charge termination techniques to the inflection point detection technique. These alternative techniques can be used as the primary termination scheme or as a backup approach. In particular, because various conditions, such as a battery that is already substantially fully charged, can cause the voltage-time curve to deviate from the characteristic curve shown in FIG. 1, it is advisable to provide alternative charge termination criteria to prevent overcharging under these conditions. Typical alternative charge termination techniques include a simple time-out criteria and a so-called "minus ΔV" criteria. The time-out criteria terminates the charging process after a predetermined time period has elapsed. The minus ΔV criteria terminates the charging process after the monitored battery voltage has dropped by a predetermined amount, which is indicative of having passed the point C on the curve in FIG. 1.

Several problems, however, arise when adapting the known battery charger, as described in the above-noted Saar et al. patents, to a charger capable of simultaneously charging multiple batteries. For example, with respect to the time-out termination criteria, a charge time of appropriate length when a single battery is installed in the charger can, for the reasons described above, result in premature charge termination when more than one battery is charging simultaneously. Moreover, because multiple batteries may have widely varying states of charge when plugged into the charger, and also may be plugged into and removed from the charger at different times, it is not readily apparent how the time-out criteria can be modified to accommodate the variety of dynamic conditions which may be encountered.

In addition, it has been observed that the monitored voltage of a charging battery may temporarily drop when one or more discharged batteries are initially plugged into the charger. This drop in battery voltage may be sufficient to satisfy the minus ΔV criteria, thereby resulting in erroneous or premature charge termination.

The battery charger according to the present invention comprises a multiple port battery charger that overcomes the above-described disadvantages of the prior art. In particular, in order to optimally charge a plurality of batteries at the same time with the available energy from a single power source, the present controller time multiplexes the charge current between each of the batteries. In other words, the first battery receives the entire charge current for a first period of time, then the second battery receives the entire charge current for a second equal period of time, and so on. In this manner, charge current is applied to all of the batteries at a higher, non-diluted level at which the batteries charge more efficiently, thereby minimizing the total charge time of the batteries. Therefore, if it takes 60 minutes for the charger to fully charge a single battery, it will take 120 minutes to fully charge two batteries and four hours to fully charge four batteries.

The present battery charger further includes a separate timer for each battery port or bay in the charger. Thus, each timer is initiated only when a battery has been inserted into its respective bay. In addition, the rate at which each timer is incremented is adjusted in accordance with the number of batteries presently in the charger. Thus, for example, if a single battery is inserted into the first bay of the charger, the timer associated with the first bay will increment at the normal clock rate. However, if a second battery is inserted into the charger, the timers for both occupied bays will effectively run at one-half the normal rate to account for the fact that the charge current is being multiplexed between the two batteries. Significantly, it will be appreciated that because time-multiplexing of the charge current between the various batteries in the charger produces a proportionate change in the required charge times, the effective rates at which the various timers are incremented can be changed in a corresponding predictable manner. Therefore, the battery charger according to the present invention is able to readily accommodate the various dynamic conditions that can frequently be encountered by users inserting and removing batteries from the charger.

Finally, the present battery charger is adapted to sense when one or more additional batteries have been inserted into the charger and in response temporarily disable the minus ΔV charge termination algorithm for any battery already in the charger. This ensures that charging is not erroneously terminated in response to the drop in battery voltage caused by the insertion of the additional batteries into the charger. Preferably, however, the timer for the already occupied battery bay will remain operative at all times during the charging process.

Additional objects and advantages of the present invention will become apparent from a reading of the following detailed description of the preferred embodiment which makes reference to the drawings in which:

BRIEF DESCRIPTION OF THE DRAWINGS

FIG. 4 is a diagram illustrating the content of the memory banks for the various battery ports;

DETAILED DESCRIPTION OF THE PREFERRED EMBODIMENT

Figure 1:
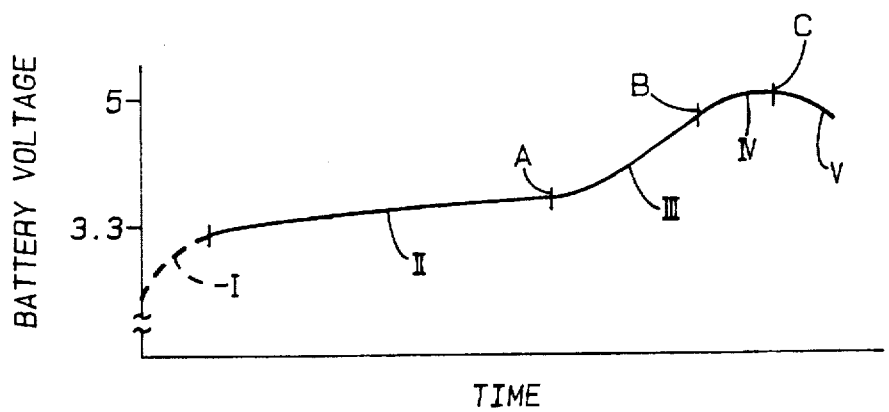
FIG. 1 is an exemplary voltage-time charging curve for a NiCad battery.
Figure 2:
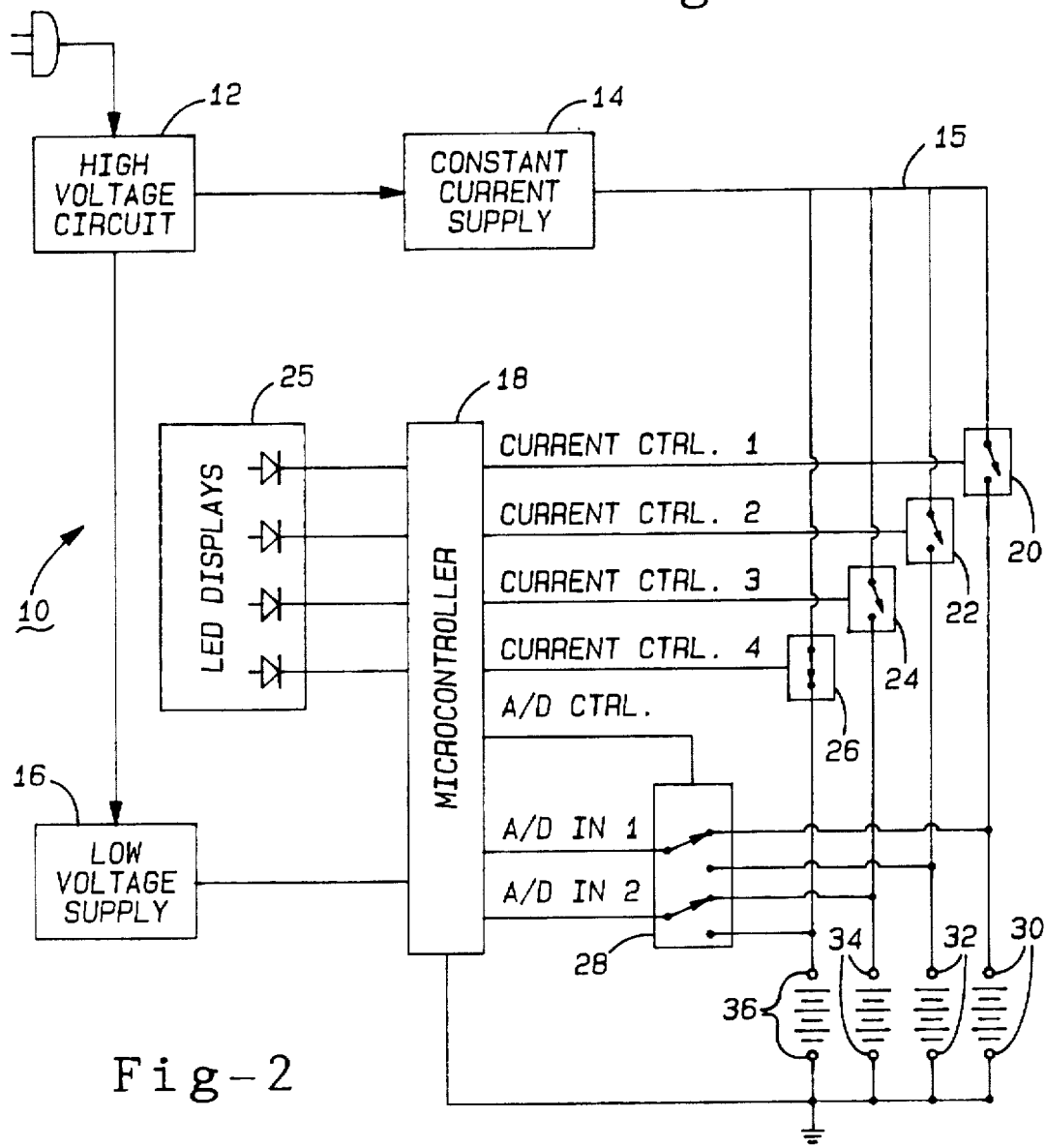
FIG. 2 is a schematic block diagram of the battery charger according to the present invention.

Referring to FIG. 2, a battery charger control circuit 10 according to the present invention is shown. It is noted that the disclosed circuit configuration is illustrative of the presently preferred manner of implementing the teachings of the present invention. However, as will readily be appreciated by those skilled in the art, the present invention is equally applicable to other circuit configurations. Control circuit 10 includes a high voltage circuit 12 and a constant current supply 14 that are adapted to provide charging current through a plurality of solid-state switching devices 20–26 to a corresponding plurality of battery charging ports or bays 30–36. In the present embodiment, the battery charger includes four separate charging ports 30–36 for simultaneously charging up to four batteries. High voltage circuit 12 and constant current supply 14 include an impedance limited a.c. transformer that is adapted to supply a total of 1.2 amps through a full-wave bridge rectifier circuit and a series impedance to the parallel-connected battery bays 30–36. The application of charging current to each of the various battery bays 30–36 is controlled by the conductive states of the respective solid-state switching devices 20–26 connected in series with each battery bay. The output from the a.c. transformer in the high voltage circuit 12 is also provided to a low voltage supply circuit 16 that is adapted to supply a regulated 5-volt supply signal to the various low voltage components in the circuit 10, including a microcontroller 18 and a two-state switching circuit 28. The microcontroller 18 is programmed to selectively control the supply of charging current from constant current supply line 15 to each of the battery bays 30–36. In particular, when the microcontroller 18 produces a HI output signal on current control line 1, solid-state switching device 20 is rendered conductive and charging current is supplied to the battery inserted in bay 30. Similarly, when the microcontroller 18 produces a HI output signal on current control line 2, solid-state switching device 22 is rendered conductive and charging current is supplied to the battery inserted in bay 32, and so on. An LED display 25 comprising four LEDs positioned adjacent to each of the four battery bays on the charger is connected to the microcontroller 18. The microcontroller 18 is programmed to illuminate the respective LED from the display 25 whenever a battery is being charged in one of the charge bays 30–36.

The microcontroller 18 is also programmed to monitor the charging process by monitoring the voltage of each battery in the charger bays 30–36. When the microcontroller 18 determines that a battery is fully charged, the appropriate switching device 20–26 is disabled and the supply of charging current to the fully charged battery is terminated. To monitor battery voltage, the analog voltage signals from each of the up to four batteries must be converted to corresponding digital values. The particular microcontroller 18 used in the preferred embodiment comprises a Zilog, Model Z86-C04 which includes 1K bytes of ROM, 124 bytes of RAM, and two internal A/D converters. Accordingly, in order to monitor all four battery bays 30–36, a two-state analog multiplex circuit 28 is provided that enables the microcontroller 18 to simultaneously sample the voltages of two batteries at the same time. In particular, with multiplex circuit 28 in a first state, microcontroller 18 can sample the voltages of the batteries in bays 30 and 34. In response to a control signal from microcontroller 18 on the A/D control line, the multiplex circuit 28 switches to its second state enabling the microcontroller 18 to sample the voltages of the batteries in bays 32 and 36. Preferably, the sampled battery voltage signals are digitally filtered by the microcontroller 18 to minimize the effects of noise and other fluctuations in the monitored signals. A preferred technique for digitally filtering the battery voltage signals is described in U.S. Pat. No. 5,268,630 to Brotto et al. and assigned to the assignee of the present invention.

Turning to FIGS. 3–6, flowchart diagrams of a preferred method of implementing the charge control process according to the teachings of the present invention are shown. As will be appreciated by those skilled in the art, the programming approach used in the preferred embodiment enables the use of a microcomputer having only 1K bytes of ROM and 124 bytes of RAM, thereby minimizing the cost of the microcontroller. Obviously, however, other programming approaches for implementing the present invention are possible.

Figure 3:
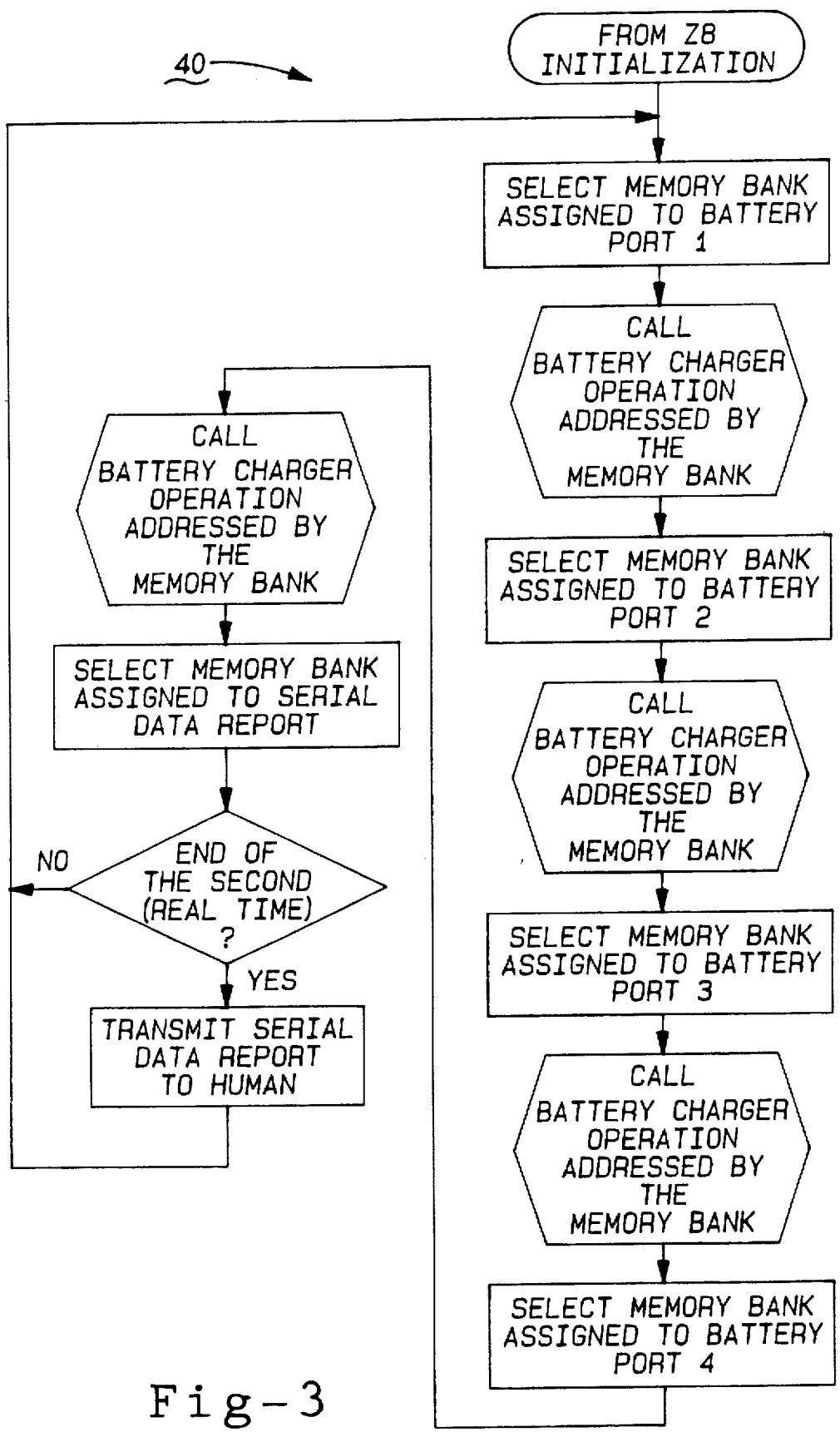
FIG. 3 is a flowchart diagram of the MAIN program control loop of the microcontroller.

Referring initially to FIG. 3, the MAIN program control loop 40 is shown. In that the charger described in the preferred embodiment includes four separate battery bays, the MAIN control program 40 sequentially attends to each of the four battery bays. The particular functions or operations performed by the controller while attending to each bay are dependent upon the particular operating mode the bay is presently in. Specifically, and with additional reference to FIG. 5, each bay has six different operating states or modes: (1) STANDBY 42; (2) STATUS 44; (3) CHARGING 46; (4) EQUALIZATION 48; (5) MAINTENANCE 50; and (6) PROBLEM 52. A battery port is in the STANDBY mode 42 when the port is empty. The STATUS 44 mode is entered whenever a battery is initially inserted into a port. The microcontroller conducts various preliminary status checks on the battery while in the STATUS mode, and then changes to the CHARGING mode 46, during which time the primary charging of the battery takes place. Upon termination of the CHARGING mode, the port enters the EQUALIZATION mode 48. The EQUALIZATION mode is used to equalize the charge level on all the cells in a multi-cell battery pack. Thereafter, the port changes to the MAINTENANCE mode 50 during which the charger applies a slow "trickle" charge to the battery to compensate for long term self-discharge of the battery. Consequently, the battery port will remain in the MAINTENANCE mode until the user removes the battery from the port. Finally, the PROBLEM mode 52 is entered whenever a problem condition with the battery is detected, such as in response to one of the status tests conducted during the STATUS mode 44.

The microcontroller keeps track of the operating mode of each of the four battery ports based upon the particular entry point address stored in the memory bank for that battery port. With additional reference to FIG. 4, the microcontroller writes into and reads from its internal RAM a memory bank of data assigned to each of the four ports. In particular, each port has associated with it the following data: (1) battery clock; (2) various battery voltage data used to control termination of the main charging process; (3) the entry point address of the current OPERATION mode; and (4) various charger control flags. The battery clock serves several functions, but is primarily used to track the total charge time of the battery. Importantly, it will be noted that each battery port 1–4 has its own battery clock. The "raw $V_{BATT}$ data" comprises a series of consecutive $V_{BATT}$ readings (e.g., eight readings) taken by the microcontroller and averaged or digitally filtered as described in U.S. Pat. No. 5,268,630 to obtain the "new $V_{BATT}$ data". The "max $V_{BATT}$ data" comprises the greatest valid $V_{BATT}$ value observed during the charging process, and is accordingly continuously updated during the charging process as the voltage of the battery rises. The "old $V_{BATT}$ data" (which comprise previous "new $V_{BATT}$ data"), together with the other $V_{BATT}$ data is used by the microcontroller to detect the "minus ΔV" charge termination criteria. The entry point address contains the address of the particular OPERATION mode that the battery port is presently in so that the microcontroller knows where to resume its control of each battery port as it sequentially attends to each port when cycling through the MAIN control program loop 10.

Figure 6:
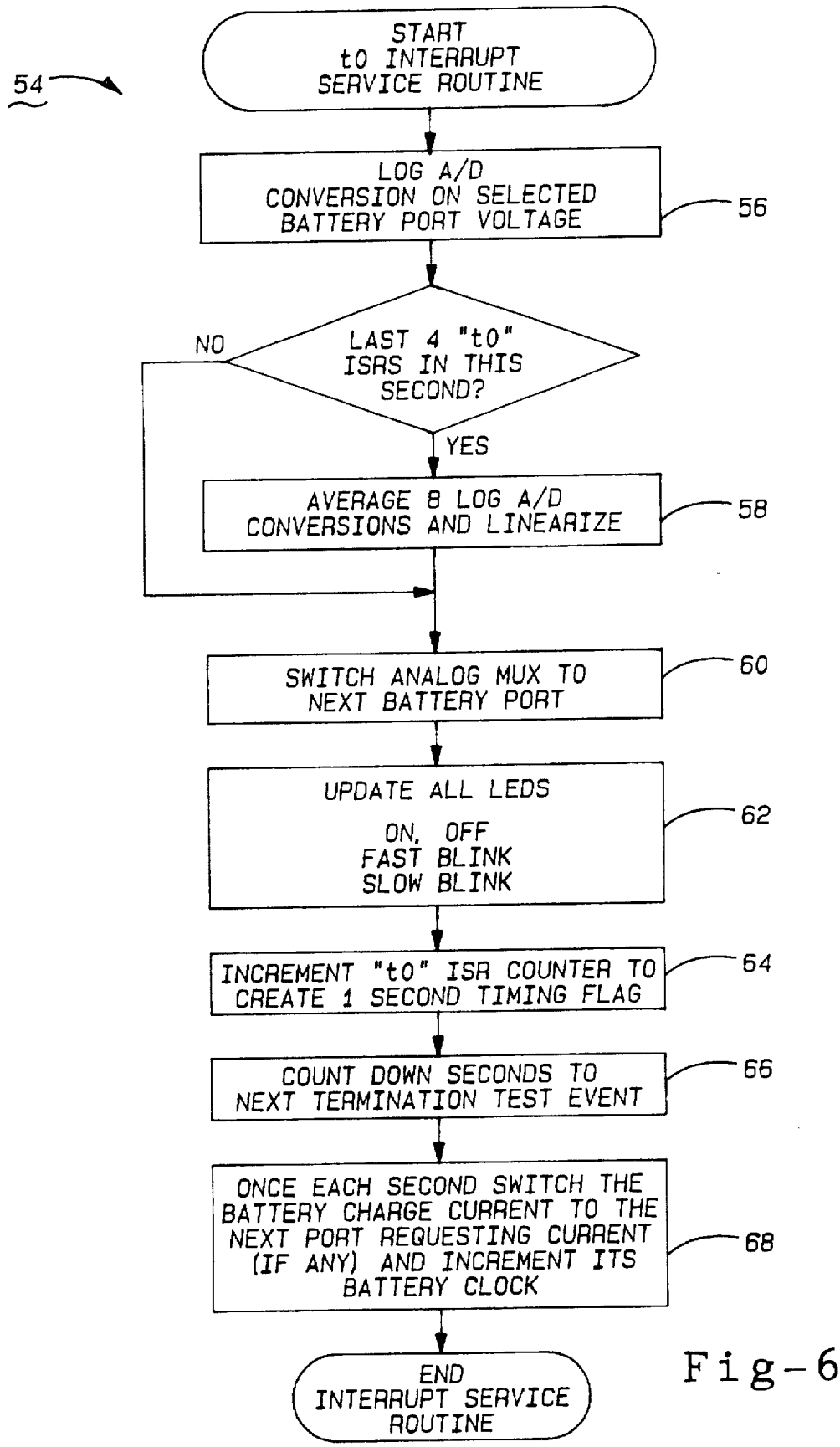
FIG. 6 is a flowchart diagram of the Interrupt Service Routine.

Finally, operating substantially continuously in the "background" is the interrupt service routine ("ISR") 54, illustrated in FIG. 6. The interrupt flag that triggers the ISR 54 occurs 64 times each second. The microcontroller uses the ISR 54 to collect the "raw" $V_{BATT}$ data and store it in the appropriate memory banks. In addition, the ISR routine is used to cycle the battery charge current to the next battery port each second and to increment the battery clock for that particular battery port when in the STATUS 44, CHARGING 46, EQUALIZATION 48, or MAINTENANCE 50 modes.

Returning now to the MAIN program loop 40, the microcontroller is programmed to initially select the battery port 1 memory bank and then go to the entry point address stored in the battery port 1 memory bank which defines the current operating mode of battery port 1. When sequenced to the next battery port 2 by the ISR 54, the microcontroller will select the battery port 2 memory bank and go to the entry point address stored in the battery port 2 memory bank defining the current operating mode of battery port 2, and so on. The serial data link referred to in the MAIN program is a diagnostic tool and forms no part of the present invention.

Figure 5:
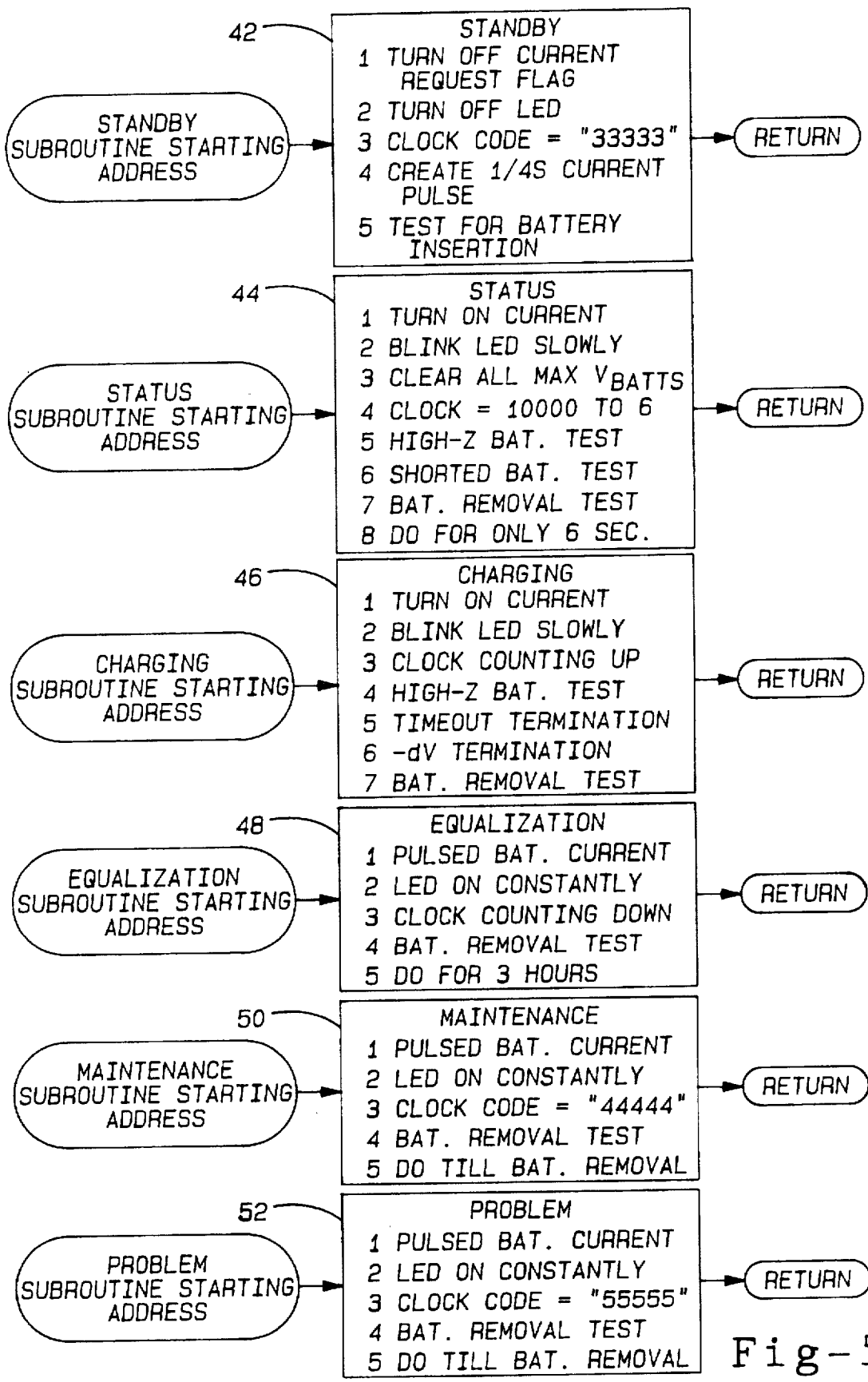
FIG. 5 is a flowchart diagram illustrating the various operating modes of the battery ports.

Referring to FIG. 5, the various charger operating modes are described. The STANDBY mode 42 is entered whenever the battery port is unoccupied. While in the STANDBY mode, the controller turns off the charge current request flag and the LED for the port. The battery clock for the port is set to all "3's" to indicate the STANDBY mode. Note that clock values in the preferred embodiment greater than $2^{15}$ are not used. Accordingly, clock values 33333, 44444, and 55555 are used as codes to indicate the STATUS 44, MAINTENANCE 50, and PROBLEM 52 modes, respectively.

While in the STANDBY mode 42, the microcontroller repeatedly tests for insertion of a battery. Battery insertion is detected by detecting a voltage across the respective battery terminals 30–36 of the port. However, because a deeply discharged battery may have insufficient energy to produce even a threshold voltage level, the microcontroller is programmed to supply a ¼ second charge current pulse to the battery terminals before testing for the presence of a battery. In this manner, if a deeply discharged battery has been inserted into the port, the ¼ second current pulses will be sufficient to raise the energy level of the battery to a detectable level. If the presence of a battery is detected, the operating mode of the battery port is changed to the STATUS mode 44.

In the STATUS mode 44, the microcontroller checks the battery for various fault conditions, including high impedance and a shorted battery. In order to perform these tests on a deeply discharged battery, it is necessary to supply energy to the battery. Accordingly, charge current is turned on for six seconds and the port LED is blinked slowly to indicate the STATUS mode 44. A 6-second test period is selected in the preferred embodiment to provide a sufficient period of time to identify the presence of a shorted battery. Assuming the battery does not fail these tests, the port is sequenced after the six-second test interval to the CHARGING mode 46. (Note, if there are two batteries in the charger, the 6-second STATUS mode 44 will actually take 12 seconds; if there are three batteries present, it will take 18 seconds, and if four batteries are present, it will take 24 seconds.)

Figure 7:
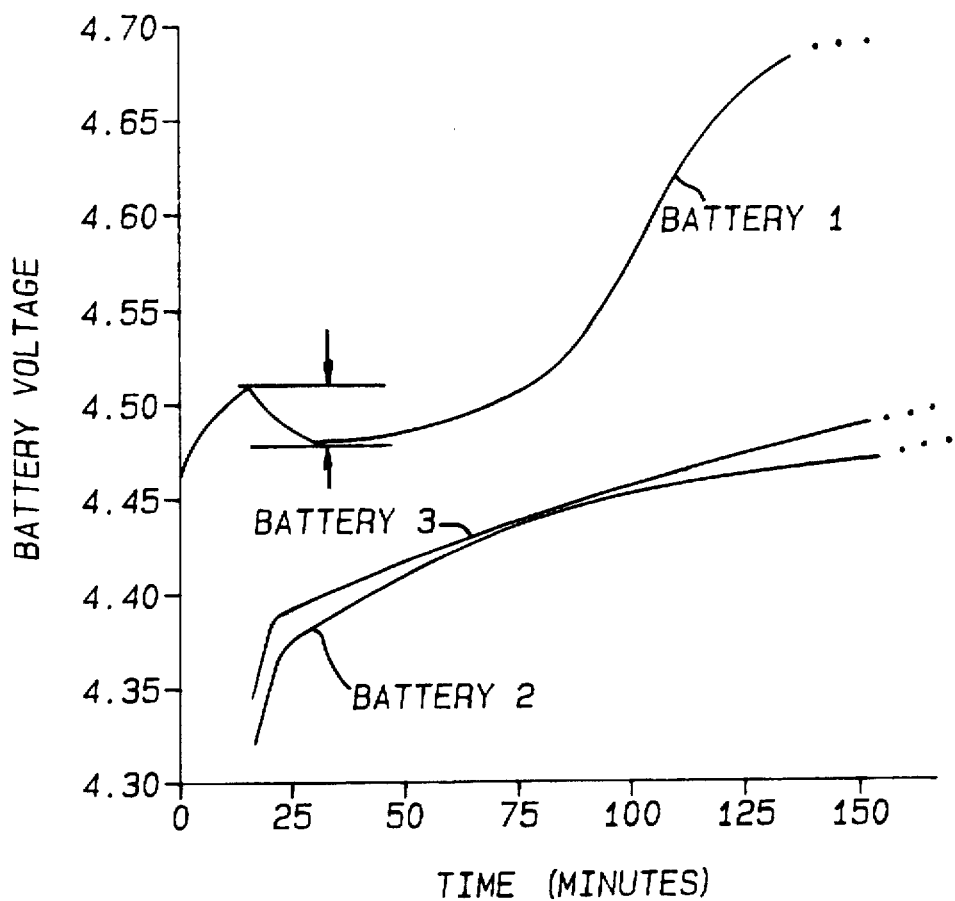
FIG. 7 is a diagram illustrating the effect on the battery voltage of a battery in the process of being charged when additional batteries are inserted into the charger.

Importantly, it will be noted that during the STATUS mode 44 which immediately succeeds detection of a newly inserted battery, the max $V_{BATT}$ values for all of the battery ports are cleared from the various memory banks. The purpose of this step is illustrated by the diagram shown in FIG. 7. When a battery is in the process of being charged and one or more additional batteries are inserted into the charger, the voltage of the first battery may temporarily drop, as shown in FIG. 7. Moreover, this drop in voltage may be sufficient to satisfy the minus $\Delta V$ charge termination criteria, thereby falsely signalling a fully charged battery. In order to prevent this from occurring, the stored max $V_{BATT}$ values in all four memory banks are cleared whenever the STATUS mode 44 is entered for any battery port. Since a comparison to the max $V_{BATT}$ value is used when conducting the minus $\Delta V$ charge termination test, clearing the max $V_{BATT}$ values from the memory banks for the various battery ports effectively disables the minus $\Delta V$ charge termination test. Due to the structure and timing of the program in the preferred embodiment, once cleared it will take at least four minutes for a new max $V_{BATT}$ value to be entered into the memory banks. Consequently, the preferred embodiment of the present controller effectively disables the minus $\Delta V$ charge termination test for at least four minutes following the insertion of a battery into any port of the charger. In addition, it will be appreciated that if other alternative charge termination criteria are used that involve the evaluation of the battery voltage curve, such as the double inflection point technique described in U.S. Pat. Nos. 4,388,582 and 4,392,101, then it may also be necessary to temporarily disable these test criteria as well whenever a battery is inserted into the charger.

Finally, it will be noted that the microcontroller is programmed to test for battery removal during the STATUS mode 44, as it does in all of the remaining operating modes 46-52, and returns the port to the STANDBY mode 42 whenever the battery in that port is removed.

In the CHARGING mode 46, full current is applied to the battery and the LED is blinked slowly to indicate to the operator that the battery is being charged. In addition, the battery clock for the port is reset to zero at the beginning of the charging process and incremented upward whenever charge current is being supplied to the battery. Note, if there is more than one battery in the CHARGING mode 46 at the same time, full charge current will be applied to each battery in sequential one-second intervals. Thus, if four batteries are being charged simultaneously, each battery will receive full charge current for a one-second period every four seconds. Similarly, if two batteries are being charged simultaneously, each battery will receive full charge current for a one-second period every two seconds, and so on.

The battery clock for a port is incremented by one second during the ISR 54 at step 68 when charging current is switched to its respective port. Thus, if there are two batteries in ports 1 and 2 of the charger, the microcontroller is programmed to initially apply full charge current to the battery in port 1 for one second and increment the port 1 battery clock by one second, and then switch the charge current to the battery in port 2 for one second and increment the port 2 battery clock by one second, and so on. In this manner, the battery clocks for the respective ports are able to accurately track the actual charge time of each battery, which is used as a charge termination test criteria in the CHARGING mode 46. Additionally, as previously noted, the microcontroller also tests for the minus $\Delta V$ termination criteria during the CHARGING mode 46 and switches the operating mode for the port to the EQUALIZATION mode 48 if either charge termination test criteria is satisfied.

The purpose of the EQUALIZATION mode 48 is to ensure that all of the cells in a multiple cell battery pack are charged to the same level. This is accomplished by pulsing the charge current to the battery at a slow rate (e.g., 1 second on, 14 seconds off) for an extended period of time (e.g., 3 hours). During this time the LED for the port is illuminated continuously to indicate to the user that the battery is in the EQUALIZATION mode.

Following the EQUALIZATION mode 48, the port changes to the MAINTENANCE mode 50 wherein a very slow trickle charge (e.g., 1 second on, 1 minute off) is applied to the battery to compensate for long term self-discharge of the battery. The port LED is illuminated continuously and the battery clock is set to "44444" to designate the MAINTENANCE mode 50. Note that if the user leaves the battery in the charger, the port will remain in the maintenance mode indefinitely.

Finally, the microcontroller will switch the port to the PROBLEM mode 52 whenever a high impedance or shorted battery is detected. Charge current to the battery port is turned off and the port LED is blinked rapidly to signal the user of a problem condition. The battery clock is also set to the "55555" problem code. The port will remain in the PROBLEM mode 52 until the user removes the battery from the port.

Turning now to FIG. 6, the details of the Interrupt Service Routine 54 are shown. As previously noted, the ISR 54 is entered by an interrupt signal 64 times each second. The microcontroller collects the $V_{BATT}$ data at step 56 by selectively sampling its A/D input ports and performing logarithmic analog-to-digital conversions on the sensed voltage data in accordance with the teachings of U.S. Pat. No. 5,449,997 to Gilmore et al., and assigned to the assignee of the present invention. The digitized "raw $V_{BATT}$ data" are then averaged at step 58 in accordance with the teachings of the aforementioned U.S. Pat. No. 5,268,630 to Brotto et al. The analog multiplex circuit 28 is switched to the next port at step 60 when necessary and the control status of the LEDs of the various ports are updated in accordance with the operation modes described above in step 62. The ISR "t0" counter incremented at step 64 is used to time the one-second multiplex periods that control the sequencing of the microcontroller through each of the four battery ports. During the CHARGING mode 46, the microcontroller is programmed to conduct the minus $\Delta V$ charge termination test once every 60 seconds. Step 66 in the ISR 54 is used to time the period between successive test events. Finally, in step 68, the microcontroller switches the battery charge current to the next port requesting charge current (by controlling the conductive states of the solid-state switching devices 20-26), and increments the battery clock for that port before exiting the Interrupt Service Routine.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A battery charger having multiple ports for receiving and charging a plurality of batteries, comprising:

a power source for supplying charging current to the batteries; and a control circuit for controlling the application of charging current to the batteries and terminating the application of charging current to a battery whenever the total period of time charging current has been applied to the battery exceeds a predetermined limit, and including a clock circuit for separately monitoring the cumulative period of time each of the batteries has been receiving charging current from said power source and means for adjusting the rate at which said clock circuit is incremented based upon the number of batteries being charged by the battery charger.

2. The battery charger of claim 1 wherein said control circuit applies charging current to different ones of the batteries being charged at different times and further wherein said clock circuit adds to said cumulative time period for a particular battery only during the time period when charging current is being applied to said particular battery.

3. A battery charger having a plurality of ports for receiving and charging one or more up to said plurality of batteries,
   a power source for supplying charging current to the batteries; and
   a control circuit for controlling the application of charging current to the one or more batteries in the charger by monitoring the voltage of each of the batteries while the batteries are being charged, and including first termination means for terminating the application of charging current to a battery whenever the voltage of the battery changes in a predetermined manner, and disabling means for temporarily disabling said first termination means whenever an additional battery is initially inserted into the battery charger.

4. The battery charger of claim 3 wherein said first termination means terminates the application of charging current to a battery when the voltage of the battery decreases by more than a predetermined amount.

5. The battery charger of claim 3 wherein said control circuit applies charging current to different ones of the batteries being charged at different times.

6. The battery charger of claim 5 wherein said control circuit is adapted to successively apply the charging current from said power source in sequence to each of the batteries being charged.

7. The battery charger of claim 6 wherein said control circuit applies charging current for an equal predetermined period of time to each of the batteries being charged.

8. The battery charger of claim 7 wherein said control circuit further includes second termination means operative alternatively to said first termination means for terminating the application of charging current to a battery whenever the cumulative period of time charging current has been applied to the battery exceeds a predetermined limit, and a clock circuit for separately monitoring the cumulative period of time each of the batteries has been receiving charging current from said power source by adding to said cumulative time period for a particular battery only during said predetermined period of time when charging current is being applied to said particular battery.

9. In a battery charger having a plurality of ports for receiving and charging one or more up to said plurality of batteries from a source of charging current; the method of controlling the application of charging current to the one or more batteries in the charger by sequentially and repetitively supplying the charging current to each of the batteries in succession such that each battery is cyclically charged for predetermined periods of time at spaced time intervals, and further including the steps of monitoring the cumulative period of time each of the batteries has been receiving charging current and terminating the application of charging current to a battery whenever the cumulative period of time charging current has been applied to the battery exceeds a predetermined limit.

10. The method of claim 9 wherein said monitoring step comprises adding to said cumulative time period for a particular battery only during the predetermined time period when charging current is being applied to said particular battery.

11. The method of claim 10 further including the steps of monitoring the voltage of each of the batteries while the batteries are being charged, and terminating the application of charging current to a battery whenever the voltage of the battery changes in a predetermined manner.

12. The method of claim 10 further including the step of skipping said last-mentioned termination step whenever an additional battery is initially inserted into the battery charger.

13. In a battery charger having multiple ports for receiving and charging a plurality of batteries from a source of charging current; the method of controlling the application of charging current to the batteries including the steps of:
   separately monitoring the cumulative period of time charging current has been applied to each of the batteries;
   terminating the application of charging current to a battery whenever the cumulative period of time charging current has been applied to the battery exceeds a predetermined limit; and
   adjusting the rate at which cumulative charge time for each battery is accumulated based upon the number of batteries being charged by the battery charger.

14. The method of claim 12 further including the steps of:
   applying charging current to different ones of the batteries being charged at different times; and
   accumulating charge time for a particular battery only during the time period when charging current is being applied to said particular battery.

15. In a battery charger having multiple ports for receiving and charging a plurality of batteries from a source of charging current; the method of controlling the application of charging current to the batteries including the steps of:
   monitoring the voltage of each of the batteries while the batteries are being charged;
   terminating the application of charging current to a battery whenever the voltage of the battery changes in a predetermined manner; and
   skipping said last-mentioned termination step whenever an additional battery is initially inserted into the battery charger.

16. The method of claim 14 wherein said termination step comprises terminating the application of charging current to a battery when the voltage of the battery decreases by more than a predetermined amount.

17. The method of claim 14 further including the step of applying charging current to different ones of the batteries being charged at different times.

18. The method of claim 16 wherein said step of applying charging current comprises the successive application of the charging current from said source in sequence to each of the batteries being charged.

19. The method of claim 17 wherein said step of applying charging current further comprises the application of charging current for an equal period of time to each of the batteries being charged.

20. The method of claim 18 further including the steps of:
   separately monitoring the cumulative period of time charging current has been applied to each of the batteries; and
   terminating the application of charging current to a battery whenever the cumulative period of time charging current has been applied to a battery exceeds a predetermined limit.

21. The method of claim 19 wherein said monitoring step comprises accumulating charge time for a particular battery only during said period of time when charging current is being applied to said particular battery.

* * * * *